UNITED STATES PATENT OFFICE.

LOUIS S. LANGVILLE, OF TROY, NEW YORK.

PROCESS OF TREATING BLACK-ASH RESIDUUM OF WOOD-PULP MANUFACTURE.

SPECIFICATION forming part of Letters Patent No. 506,051, dated October 3, 1893.

Application filed January 7, 1893. Serial No. 457,587. (No specimens.)

*To all whom it may concern:*

Be it known that I, LOUIS S. LANGVILLE, of the city of Troy, county of Rensselaer, and State of New York, have invented a Process for Treating the Black-Ash Residuum of Wood-Pulp Manufacture, of which the following is a specification.

My invention relates to an improved process for producing the carbon product described and claimed in Letters Patent No. 475,062, granted to me the undersigned on May 17, 1892; and the object and purpose of my improved process are to benefit the material itself by the removal of foreign substances, and by treatment to accelerate its preparation.

The carbon product described in my said Letters Patent is obtained from the black-ash resulting as a residuum of wood pulp manufacture, when the alkaline treatment is used, and the following procedure is had:

Wood cut up into chips is placed in a digesting apparatus where under the influence of steam pressure and heat it is treated with soda (made caustic as a hydrate by lime) which dissolves from the wood cellulose the silica, converting it into a silicate of soda, and saponifies the resins and gum resins, making them soluble. After a treatment sufficient to accomplish these results the liquor is drawn off from the wood cellulose, and contains some of the latter, the silicate of soda obtained from the action of the caustic soda upon the silica contained in the wood, and also the resinous substances that have been saponified by the caustic alkali. This liquor is then condensed by evaporation and transferred to a carbonizing furnace wherein by the aid of heat, fire and the carbonic acid gas produced by the latter, the soda hydrate is converted again into carbonate of soda, or as termed in the art "recarbonized." After this is accomplished the carbonate of soda and silica of soda are removed by leaching, the residuum with water; the remaining material consisting of the carbonized wood-cellulose, and carbonized resinous matter and a trace of alkali, together with such foreign substances as have become mixed with it during the several steps it has been passed through, such as sand, firebrick chips from the furnace linings, chips of iron from the machinery cutting the wood into chips, and other substances incident to the handling of the material.

To treat the black-ash residuum by my new process, it is mixed with water and caused to flow through a long trough having riffles in its bottom at right angles to the direction in which the material flows; the carbon being lighter than such foreign substances as may have been mixed with it, floats while these impurities sink and are caught in the riffles. From the trough the liquor is discharged into a tank where it is kept agitated, and treated with a weak solution of acid, preferably hydrochloric acid. From this tank it is passed to another where it is washed by the aid of steam heat, and constant stirring. From this latter tank it is passed to settling tanks, where it is collected and the supernatant liquid drawn off, from whence it is carried to a dry room. When dried it is then pulverized and packaged for market. As thus treated all the impurities which become mixed with the black-ash while in the converter, and during the recarbonizing process and which are denser than the carbon, are removed, and the value of the product is materially increased.

The object of using an acid treatment to dissolve off the remaining alkali facilitates the removal of the latter, although the same results may be accomplished by repeated washings aided by heat. The residuum thus treated is well adapted for making electric light carbons, india ink for drawing purposes, as an ingredient for writing ink, gunpowder, paint and other uses where carbon is employed.

Having thus described my improved method of treating black ash to purify and make valuable the carbon which it contains, what I claim, and desire to secure by Letters Patent, is—

The process herein described for treating black ash residuum consisting in running it mixed with water through a trough containing riffles in its bottom, and into a tank; then treating it to remove the remaining trace of alkali by repeated washing and agitation and by acid, then conveying it into tanks to settle, to be followed by drawing from off it the supernatant liquor; then conveying it to a drying room, and when dried, pulverizing it, as and for the purposes herein set forth.

Signed at Johnsonburg, Pennsylvania, this 29th day of November, 1892, and in the presence of the two witnesses whose names are hereto written.

LOUIS S. LANGVILLE.

Witnesses:
A. G. FORSTER,
JOHN DAVIES.